Feb. 7, 1961 W. T. MORRIS 2,970,344
TIRE CURING BAG CONSTRUCTION
Filed Nov. 6, 1958 2 Sheets-Sheet 1
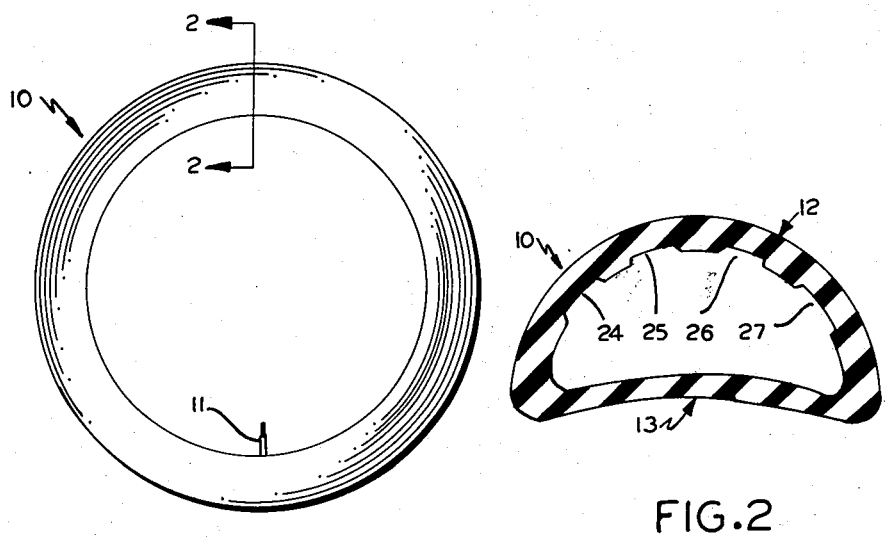
FIG.1
FIG.2
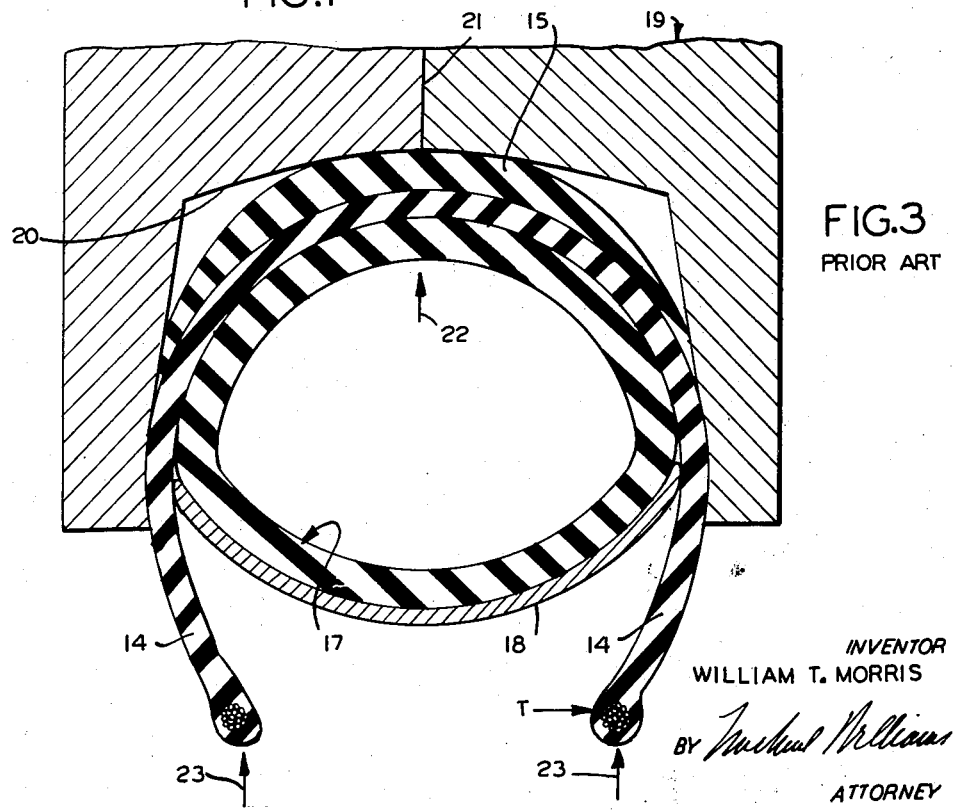
FIG.3
PRIOR ART
INVENTOR
WILLIAM T. MORRIS
BY
ATTORNEY INVENTOR
WILLIAM T. MORRIS
BY *Michael Williams*
ATTORNEY

United States Patent Office 2,970,344
Patented Feb. 7, 1961

2,970,344

TIRE CURING BAG CONSTRUCTION

William T. Morris, Warren, Ohio
(R.D. 2, Park Road, Conneaut Lake, Pa.)

Filed Nov. 6, 1958, Ser. No. 772,285

3 Claims. (Cl. 18—45)

The present invention relates to apparatus for use in retreading pneumatic tires, more particularly to the curing bags employed to force the tire into a mold cavity in which it is cured, and the principal object of the present invention is to provide new and improved apparatus of such character.

When retreading pneumatic tires, the remaining old tread is first removed by buffing or the like to roughen the surface and expose fresh rubber stock. A strip of uncured rubber is then cemented to the periphery of the tire and the latter is then placed in a suitable mold for a period of time where the tread pattern is impressed in the uncured rubber and where the latter is cured under the combined influence of heat and pressure.

In order to force the tire to fill the mold cavity and to hold it therein during the curing operation, an annular curing bag, or tube, is inserted within the tire in much the same manner as the conventional inner tube. Backing up the curing bag, or tube, and confining it within the tire, is an annular curing rim which is inserted within the tire following insertion of the tube therein and which extends from side wall to side wall thereof to define with the tire a space within which the tube is confined.

The present invention is concerned with the curing bag, or tube, and contemplates certain improvements therein which add materially to the useful life of these relatively expensive components. Other advantages of the invention will readily become apparent from a study of the following description and from the drawings appended hereto.

Figure 4:
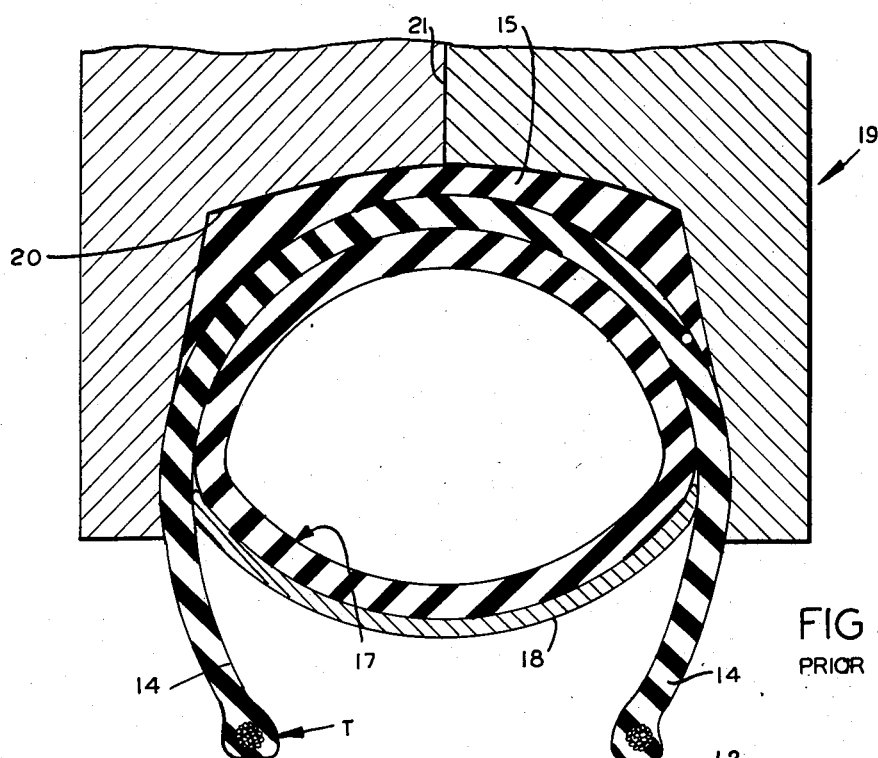
Figure 5:
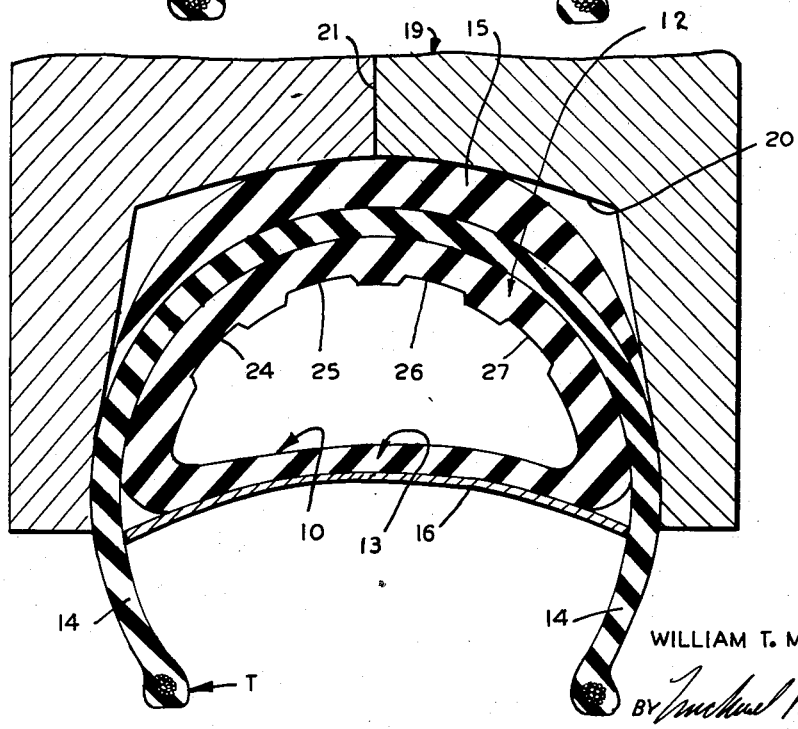

In the drawings accompanying this specification and forming a part of this application there is shown, for purpose of illustration, an embodiment which the invention may assume, and in these drawings, Figure 1 is an elevational view of a curing tube constructed in accordance with the present invention, Figure 2 is an enlarged, transverse sectional view generally corresponding to the line 2—2 of Figure 1, Figure 3 is a view similar to Figure 2 but taken through a prior art curing tube and a prior art curing rim disposed within a tire to be cured and with the latter disposed within a tire curing mold, Figure 4 is a view similar to Figure 3 but with the prior art curing tube inflated to force the tire into the mold cavity, and Figure 5 is a view similar to Figure 3 but taken through an assembly employing a curing tube constructed in accordance with the present invention.

With reference to Figure 1, the curing tube 10 of the present invention is a hollow, air-tight ring of rubber or the like which is similar to the conventional inner tube normally disposed within a tire when the latter is mounted on a rim for use on a vehicle. As will later appear, this tube differs in several important respects from the conventional inner tube; however, it has in common therewith a valve stem 11 through which fluid under pressure may be introduced into the tube and released therefrom.

As seen in transverse section in Figure 2, curing tube 10 is preferably similar to that disclosed in United States Patent No. 2,848,745, issued to me on August 26, 1958, for Tire Curing Apparatus. Briefly, since the present invention is not limited for use with curing tubes configurated as seen in Figures 2 and 5 but may also be used advantageously with differently configurated curing tubes, the tube seen in transverse section in Figures 2 and 5 has a convex portion 12 and a concave portion 13. Tube portion 12 (see Figure 5) extends from respective tire side walls 14 across the interior of the tire adjacent its tread 15 and such portion is generally configurated to conform to the interior of the tire. Tube portion 13 is generally configurated to conform to the convex facing surface of the curing rim 16 which confines the tube within the tire during the curing operation.

Before proceeding further with the description of the present invention, it is believed that an understanding of what occurs during use of prior art curing tubes will be helpful. Accordingly, there is shown in Figure 3 a prior art curing tube 17 disposed within a tire T upon which the tread 15 is to be cured. This tube is retained within the tire by means of a curing rim 18 which extends from side wall to side wall of the tire. Tube 17, as will be evident, is generally oval in cross-section and the curing rim is transversely curved for complementary engagement with the tube.

The tire seen in Figure 3 is shown confined within a mold 19 having an annular cavity 20 for receiving the tire. As will be appreciated, cavity 20 will carry a suitable tread design which will be impressed in the tread of the tire as the latter is forced into the cavity. The mold 19 is usually divided along the line 21 to provide for ready insertion and removal of the tire therefrom.

With the parts positioned as seen in Figure 3, it will be noted that the tire does not completely fill the mold cavity at this time. To cause the tire to forceably fill such cavity is the function of the curing tube as will appear.

Upon inflation of the curing tube 17, the latter will exert an equal expansive force in all directions; however, the tube cannot expand in a direction toward the rim 18 because of the rigidity of the latter. Neither can it expand in a direction toward the side walls of the tire since the latter are tightly confined by the adjoining mold surfaces. Accordingly, the only direction in which the curing tube can expand is in the direction of the arrow indicated at 22. As the tube expands and forces the tire into the mold cavity, respective tire side walls will actually be drawn further into the mold an appreciable amount in the direction indicated by the arrows identified by the reference character 23.

As a result of the expansion of the curing tube in but one direction (that direction indicated by the arrow 22), coupled with the fact that there is considerable friction between the interior of the tire and the curing tube which prevents any appreciable shifting movement of the tube within the tire to thus equalize the stresses upon the tube, substantially all of the curing tube expansion is provided by stretching of the curing tube walls adjacent respective tire side walls. This is clearly shown in Figure 4 wherein it may be seen that these curing tube walls have become thinner as a result of such stretching.

Eventually, after repeated curing operations and as a result of the repeated heavy stressing of the curing tube walls at the stretched places shown, the curing tube will fail. It is the elimination of this premature failure of the curing tube which is the principal object of the present invention.

In the past, the tube failure as above mentioned was thought to be caused by chaffing over the edge of the rim; however, this theory has been proven erroneous and applicant believes that the above mentioned disclosure of what occurs as the curing tube is inflated is the true cause of premature curing tube failure.

Since expansion of the tube is essential to proper curing of the tread, such expansion cannot be eliminated by strengthening the tube thereagainst. It has been found, however, if expansion of the tube and its consequent stretching can be distributed over a relatively wide area of the tube, the stress on any one part thereof will be considerably reduced with a resulting great increase in tube life.

In order to distribute stretching of the curing tube seen in Figures 2 and 5 over a relatively wide area, applicant preferably forms the portion of the tube adjacent the inner tread surface of the tire with a plurality of internal annular grooves 24, 25, 26 and 27. At the present time, two of these grooves are disposed on one side of the tire while the other two are disposed on the other side thereof. It will readily be appreciated, however, that this arrangement is illustrative only and that a greater or lesser number and/or arrangement of grooves may be found desirable.

The function of the grooves 24 through 27 is to weaken the tube portion adjacent the tread so as to render it more easily stretched at such portion. With this tube portion thus thinned and weakened, it will have less resistance to stretching than the thicker and stronger tube portions adjacent the side walls of the tire. However, because of the greater tendency to cause stretching of the tube portions adjacent the tire side walls as hereinbefore pointed out with respect to Figures 3 and 4, the net result will be that the majority of tube portion 12 will be stretched substantially uniformly across the tire portions with which it is engaged. With substantially uniform stretching of the tube, tube failures caused by repeated heavy stressing of but limited tube portions will be eliminated.

It is to be understood that while tube 10 has been disclosed as having a plurality of internal grooves, the tube could be tapered in thickness from a maximum adjacent respective tire side walls to a minimum adjacent the center of the tread. Moreover, the desired variation in resistance to stretching could also be accomplished by means other than varying tube wall thickness; for example, such variation could be caused by varying the composition of the rubber at different places or by including a stretch resistant fabric as a part of the tube wall.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A resilient pressure bag for insertion within a tire casing and designed to be inflated to press the tread portion of the tire casing into a mold cavity, said bag having a circumferentially extending, transversely flexible crown conforming to the inner surface of said tire casing adjacent its said tread portion, said crown having a central circumferentially continuous annular portion and circumferentially continuous annular portions of reduced thickness on opposite sides of said central portion, said crown portions of reduced thickness imparting greater transverse flexibility to the crown of said bag so that the latter may more readily expand and press said tire casing into said mold cavity.

2. A resilient pressure bag for insertion within a tire casing and designed to be inflated to press the tread portion of the casing into a mold cavity, said bag having a circumferential transversely flexible crown wall having its outer peripheral surface conforming to the inner surface of said casing adjacent its tread portion, said crown wall having alternate circumferentially continuous annular rib and groove portions on opposite sides of the center of its peripheral wall surface, the reduced thickness of said crown wall groove portions serving to increase the transverse flexibility of said bag crown wall so that the latter may more readily expand and press said tire casing into said mold cavity.

3. A resilient pressure bag insertable within a tire casing and inflatable to press the peripheral tread portion of the casing against the peripheral tread surface of a tire mold, said bag having an outer peripheral crown portion conforming to and designed to press against the inner tread surface of the tire casing and an inner peripheral base portion integrally connected to said crown portion by opposed side walls for extending between the opposed inner side wall surfaces of the tire casing, said crown portion having a central circumferentially continuous annular rib formed integrally with and extending radially inwardly from the inner central periphery of said crown portion, and a pair of circumferentially continuous annular grooves disposed on opposite sides of said rib, said grooves providing crown portions of reduced thickness to provide for transverse stretching of said crown in opposed lateral directions from its said peripheral center, whereby to compensate for frictional drag between said crown portion and the adjacent inner tread portion of the tire casing during inflation of said bag.

References Cited in the file of this patent

UNITED STATES PATENTS

| | | |
|---|---|---|
| 1,642,541 | Ellinwood | Sept. 13, 1927 |
| 1,762,830 | Mather | June 10, 1930 |
| 1,799,933 | Snyder | Apr. 7, 1931 |
| 2,695,424 | Madison et al. | Nov. 30, 1954 |
| 2,848,745 | Morris | Aug. 26, 1958 |
| 2,851,729 | Kalkofen | Sept. 16, 1958 |

FOREIGN PATENTS

| | | |
|---|---|---|
| 560,650 | Canada | July 22, 1958 |